United States Patent
Takeshita et al.

[11] Patent Number: 6,088,146
[45] Date of Patent: Jul. 11, 2000

[54] SCANNING OPTICAL SYSTEM AND A SCANNING OPTICAL APPARATUS

[75] Inventors: Kenji Takeshita, Toyokawa; Nobuo Kanai, Toyohashi; Hiroki Kinoshita; Satoshi Iwasaki, both of Toyokawa, all of Japan

[73] Assignee: Minolta Co., Ltd., Osaka, Japan

[21] Appl. No.: 09/140,447

[22] Filed: Aug. 26, 1998

[30] Foreign Application Priority Data

Sep. 1, 1997 [JP] Japan .................................. H9-235701

[51] Int. Cl.$^7$ .................................................... G02B 26/08
[52] U.S. Cl. .......................... 359/204; 359/205; 359/206; 359/216
[58] Field of Search ..................................... 359/204–206, 359/212–219, 207, 662; 347/233, 243, 244

[56] References Cited

U.S. PATENT DOCUMENTS

| | | | |
|---|---|---|---|
| 5,245,462 | 9/1993 | Kanai et al. | 359/204 |
| 5,251,055 | 10/1993 | Koide | 359/216 |
| 5,774,249 | 6/1998 | Shiraishi et al. | 359/205 |
| 5,801,746 | 9/1998 | Yamaguchi et al. | |

FOREIGN PATENT DOCUMENTS

| | | |
|---|---|---|
| H4-149481 | 5/1992 | Japan . |
| H8-313833 | 11/1996 | Japan . |

*Primary Examiner*—James Phan
*Attorney, Agent, or Firm*—Burns, Doane, Swecker & Mathis, LLP

[57] ABSTRACT

In a scanning optical system in which a plurality of light beams emitted from a plurality of light sources are, after being formed into beams converging in a predetermined manner, deflected by a single deflector and are then shone, through scanning lens systems provided one for each light beam, onto a scanned surface so that the scanned surface is scanned by the light beams for image formation, at least one of the scanning lens systems satisfies the condition $0<-\{(L-HH')+k\}/k\leq0.2$, where L represents the distance from the point of deflection of the light beam to the scanned surface, HH' represents the distance from the front-side principal point to the rear-side principal point of the scanning lens system, and k (k<0) represents the constant of proportionality defined by the formula $y'=k\theta$, where y' represents the image height on the scanned surface in the main scanning direction, and θ represents the angle of deflection, that is, the angle that the light beam, after being deflected by the deflector, forms with respect to the optical axis of the scanning lens system.

7 Claims, 11 Drawing Sheets

SCANNING OPTICAL SYSTEM AND A SCANNING OPTICAL APPARATUS

This application is based on application No. H09-235701 filed in Japan, the content of which is hereby incorporated by reference.

BACKGROUND OF THE INVENTION

1. Field of the Invention

The present invention relates to a scanning optical system and a scanning optical apparatus for focusing a light beam such as a laser beam onto a scanned surface for scanning, and more particularly to a scanning optical system and a scanning optical apparatus suitable as an image writing means used in a digital image forming apparatus such as a digital copier and a printer.

2. Description of the Prior Art

In recent years, an increasing number of digital image forming apparatuses adopt, as the scanning optical systems that they use as image writing means, multiple-beam optical systems to cope with increasingly high-speed, high-resolution, and full-color image formation. Multiple-beam optical systems are optical systems in which the light beams emitted from a plurality of light sources are simultaneously shone onto a scanned surface to form an image thereon. For example, nowadays, the use of a scanning optical system that, by shining the light beams emitted from a plurality of light sources onto a single scanned surface to scan the surface and thereby form an image thereon, achieves higher-speed and higher-resolution image formation is not limited to applications that require tandem-type structures.

Moreover, Japanese Laid-open Patent Application No. H8-313833 proposes, for use in tandem-type structures, a color image forming apparatus in which a plurality of light sources are used separately as light sources for cyan, magenta, yellow, and black colors, and in which image formation is performed through a scanning optical system separately for individual colors and the obtained images are synthesized on a belt-shaped transfer material to form a color image thereon.

Moreover, for example, Japanese Laid-open Patent Application No. H4-149481 proposes a method for reducing variation in magnification and thereby reducing misplacement of colors by measuring the magnification in the main scanning direction with a sensor and controlling the modulation of a laser in accordance with measurement results. It is quite common to measure magnification by means of a sensor, and it is also quite common to adjust magnification by varying the modulation of a laser, or alternatively by moving a lens, mirror, or other optical component to vary the focal length or conjugate distance.

However, in the conventional scanning optical systems mentioned above, higher resolution, higher precision in printing positions, and stable spot diameter and shape cannot be obtained without compensating for spot diameter differences between light beams and printing position deviations in the main scanning direction resulting from wavelength variation differences between light sources, or from temperature differences between lenses, i.e. variation in focal length. This can be achieved by the use of expensive achromatic lenses, or by the use of a temperature-compensated optical system. However, in these conventional scanning optical systems, compensation for such variation is possible only to a limited degree because the scanning lens has a strong optical power in the main scanning direction.

One way to overcome this problem is to monitor the variation of the printing position and of the image-plane position and move lenses or change beam directions in accordance with monitored results. This, however, requires high-precision detecting and driving systems that tend to be very expensive, and even such systems only offer a limited degree of precision, a limited number of steps, and a limited extent of compensation. On the other hand, the method proposed in Japanese Laid-open Patent Application No. H4-149481 mentioned above requires expensive measurement and feedback means, and in addition requires a larger printer head so that a moving mechanisms and a sensor can be arranged therein.

SUMMARY OF THE INVENTION

An object of the present invention is to provide a multiple-beam scanning optical system, and also a scanning optical apparatus employing such a scanning optical system, that does not suffer from color misplacement resulting from magnification variation even when there are temperature differences between individual light sources and scanning lenses.

To achieve the above object, according to one aspect of the present invention, in a scanning optical system in which a plurality of light beams emitted from a plurality of light sources are, after being formed into beams converging in a predetermined manner, deflected by a single deflector and are then shone, through scanning lens systems provided one for each light beam, onto a scanned surface so that the scanned surface is scanned by the light beams for image formation, all of the plurality of light beams incident on the scanning lens systems are converging light beams.

According to another aspect of the present invention, at least one of the above-mentioned scanning lens systems satisfies the following condition:

$$0 < -\{(L-HH')+k\}k \leq 0.2,$$

where

L represents the distance from the point of deflection of the light beam to the scanned surface, HH' represents the distance from the front-side principal point to the rear-side principal point of the scanning lens system, and k (k<0) represents the constant of proportionality defined by the following formula:

$$y' = k\theta,$$

where y' represents the image height on the scanned surface in the main scanning direction, and ζ represents the angle of deflection, that is, the angle that the light beam, after being deflected by the deflector, forms with respect to the optical axis of the scanning lens system.

According to still another aspect of the present invention, in a scanning optical system in which a plurality of light beams emitted from a plurality of light sources are, after being formed into beams converging in a predetermined manner, deflected by a single deflector and are then shone, through scanning lens systems provided one for each light beam, onto a scanned surface so that the scanned surface is scanned by the light beams for image formation, at least one of the scanning lens systems satisfies the following condition:

$$0 < -\{(L-HH')+k\}/k \leq 0.2,$$

where

L represents the distance from the point of deflection of the light beam to the scanned surface, HH' represents the distance from the front-side principal point to the rear-side principal point of the scanning lens system, and k (k<0) represents the constant of proportionality defined by the following formula:

$$y'=k\theta,$$

where y' represents the image height on the scanned surface in the main scanning direction, and θ represents the angle of deflection, that is, the angle that the light beam, after being deflected by the deflector, forms with respect to the optical axis of the scanning lens system.

According to a further aspect of the present invention, a scanning optical apparatus employs a scanning optical system as described above to shine the plurality of light beams onto a plurality of scanned surfaces provided one for each light beam so that the scanned surfaces are scanned by the light beams for image formation; or alternatively, a scanning optical apparatus employs a scanning optical system as described above to shine the plurality of light beams onto a single scanned surface so that the scanned surface is scanned by the light beams for image formation.

BRIEF DESCRIPTION OF THE DRAWINGS

This and other objects and features of the present invention will become clear from the following description, taken in conjunction with the preferred embodiments with reference to the accompanied drawings in which.

DESCRIPTION OF THE PREFERRED EMBODIMENTS

Figure 1:
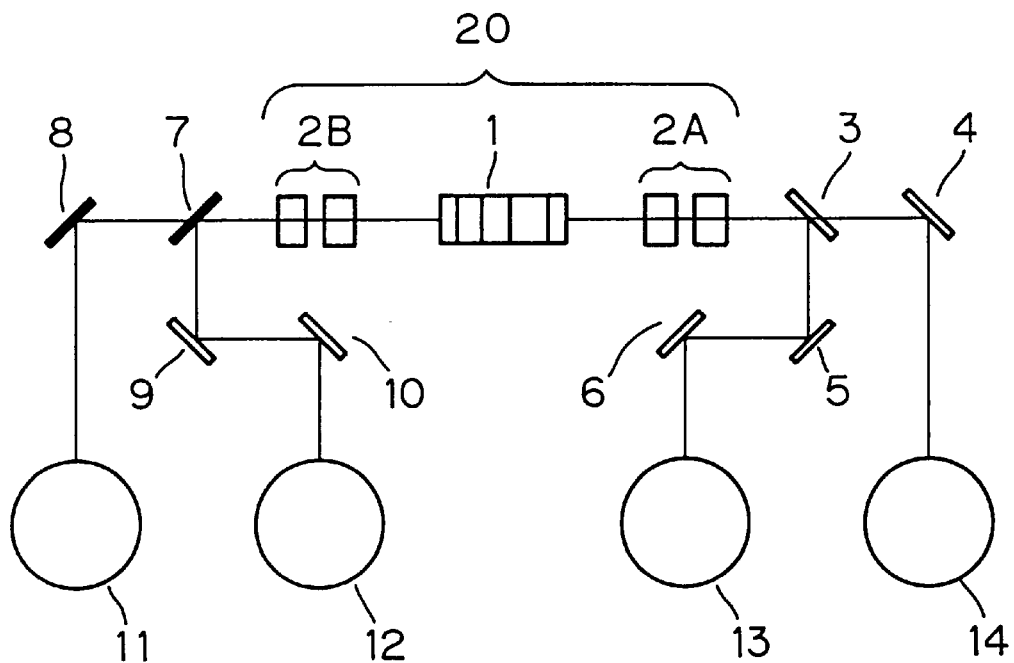
FIG. 1 is a diagram schematically showing a part of the optical paths of a scanning optical system embodying the invention.

Hereinafter, embodiments of the present invention will be described with reference to the drawings. FIG. 1 schematically shows a part of the optical paths of a scanning optical system embodying the invention. As shown in FIG. 1, the laser light beams emitted from a plurality of light sources (not shown) are first deflected by a polygon mirror 1 rotating at uniform speed (i.e. a rotary, multiple-faced mirror), and are then condensed individually by scanning lenses 2A and 2B. The polygon mirror 1, the scanning lenses 2A and 2B, and the light sources (not shown) constitute a printer head 20, which will be described in detail later.

Thereafter, one light beam is directed to a half mirror 3. The light beam that passes through the half mirror 3 is then reflected by a deflecting mirror 4 so that it is shone onto a light-sensitive drum 14, and the light beam that is reflected by the half mirror 3 is then reflected by a deflecting mirror 5 and then by a deflecting mirror 6 so that it is shone onto a light-sensitive drum 13. Another light beam is directed to a half mirror 7. The light beam that passes through the half mirror 7 is then reflected by a deflecting mirror 8 so that it is shone onto a light-sensitive drum 11, and the light beam that is reflected by the half mirror 7 is then reflected by a deflecting mirror 9 and then by a deflecting mirror 10 so that it is shone onto a light-sensitive drum 12.

The scanning lenses 2A and 2B have very weak optical powers at its edges in the main scanning direction. As a result, even when temperature differences exist between the individual components of the printer head 20, or even when wavelengths are shifted unevenly because of temperature differences between the light sources (not shown), variation in magnification does not cause color misplacement, and thus it is possible to obtain satisfactory images.

According to the present invention, the scanning lenses do not receive parallel light beams but receive converging light beams. This allows the scanning lenses to have weaker optical powers at its edges as compared with ordinary fθ lenses. Since color misplacement due to variation in magnification resulting from temperature variation increases in proportion to the optical power at the edges, the weaker the optical power at the edges, the less significant the effects of color misplacement. This will be described in more detail below in the context of the scanning optical system embodying the invention.

Figure 2:
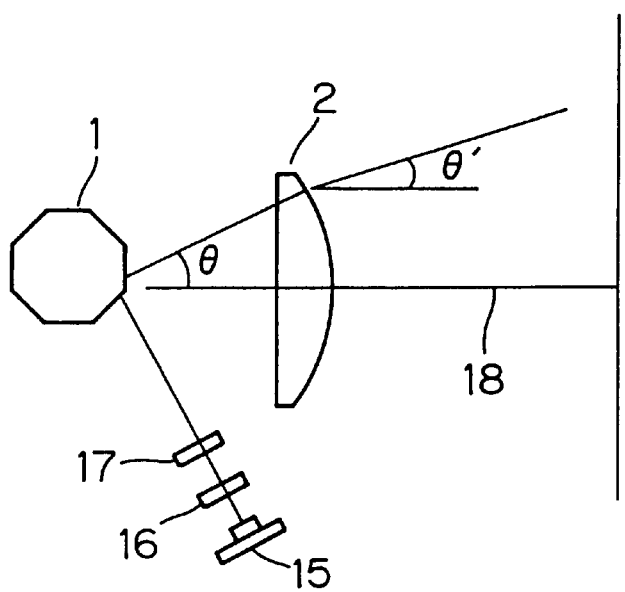
FIG. 2 is a diagram schematically showing a part of the optical path of the light beam emitted from one light source in the scanning optical system embodying the invention.

FIG. 2 schematically shows a part of the optical path of the light beam emitted from one light source in the scanning optical system embodying the invention. The light beam emitted from a light source 15 is first formed into a converging beam by a collimator lens 16, is then condensed by a cylindrical lens 17 only vertically (i.e. in the subsidiary scanning direction), and is then deflected by a polygon mirror 1. Assume that, at this time, the polygon deflection angle is θ, and the angle of the light beam having passed through a scanning lens 2 with respect to the optical axis 18 of the scanning lens 2 is θ'. Then, the optical power of the scanning lens 2 is expressed as θ'/θ, and the closer θ'/θ is to 1, the weaker the optical power.

When θ'/θ>1, the scanning lens 2 has a positive optical power, and the larger the value of θ'/θ, the stronger the positive optical power; when θ'/θ<1, the scanning lens 2 has a negative optical power; when θ'/θ=1, the scanning lens 2 has no (zero) optical power. Ordinary fθ lenses are designed to have values of θ'/θ0 in the range from 0.3 to 0.5. This is because a value of θ'/θ below 0.3 makes the lens unduly large, and a value of θ'/θ above 0.5 makes correction of aberrations including curvature of field difficult. Here, using a converging light beam helps make the value of θ'/θ closer to 1. Accordingly. by using a converging light beam, it is possible to reduce color misplacement to half or even to one third as large as in ordinary fθ lenses, and thus it is possible to obtain satisfactory images.

The range in which the optical power of the scanning lens 2 is considered to be sufficiently weak can be defined by the use of numerical expressions in the following manner. First, variation in back focal length resulting from temperature variation is determined, and then the determined variation in back focal length is converted into variation in magnification.

<1. Determining Variation in Back Focal Length in a y=kθ Lens>

For a thin lens of which the refractive index is n and of which the both surfaces have radii of curvature $r_1$ and $r_2$, the focal length f is expressed as $$1/f = (n-1)(1/r_1 - 1/r_2)$$

Here, if we assume that f=R/(n−1), then R=f(n−1), where R is a constant. Hence, differentiating the focal length f with respect to the temperature t yields $$df/dt = [(dR/dt)(n-1) - R\{d(n-1)/dt\}]/(n-1)^2$$
$$= -R(dn/dt)/(n-1)^2$$
$$= \{-f/(n-1)\}(dn/dt)$$

Hence, in a thin lens, variation in focal length resulting from temperature variation is expressed, if we assume that the coefficient of linear expansion is α, as $$\Delta f/\Delta t = f[\{-1/(n-1)\}(\Delta n/\Delta t) + \alpha] \quad (1)$$

where Δn/Δt represents the coefficient of the variation of the refractive index due to temperature variation.

On the other hand, assuming that the distance from the front-side principal point to the object is s, the distance from the rear-side principal point to the image is s', and the magnification is β, the formula of image formation is rearranged as $$1/f = 1/s' - 1/s$$

$$\beta = s'/s$$

Hence, f=ss'/(s−s'), and thus s'=sf/(f+s). Differentiating s' with respect to f yields $$ds'/df = [\{d(sf)/df\}(f+s) - sf\{d(f+s)/df\}]/(f+s)^2$$
$$= s^2/(f+s)^2 = (1 - s'/s)^2$$
$$= (1 - \beta)^2$$

Hence, variation in back focal length resulting from variation in focal length is expressed as $$\Delta s'/\Delta f = (1-\beta)^2 \quad (2)$$

From expressions (1) and (2), in a thin lens, variation in back focal length resulting from temperature variation is expressed as $$\Delta s'/\Delta t = f(1-\beta)^2 \times [\{-1/(n-1)\}(\Delta n/\Delta t) + \alpha] \quad (3)$$
$$= s'(1-\beta) \times [\{-1/(n-1)\}(\Delta n/\Delta t) + \alpha]$$

Figure 3:
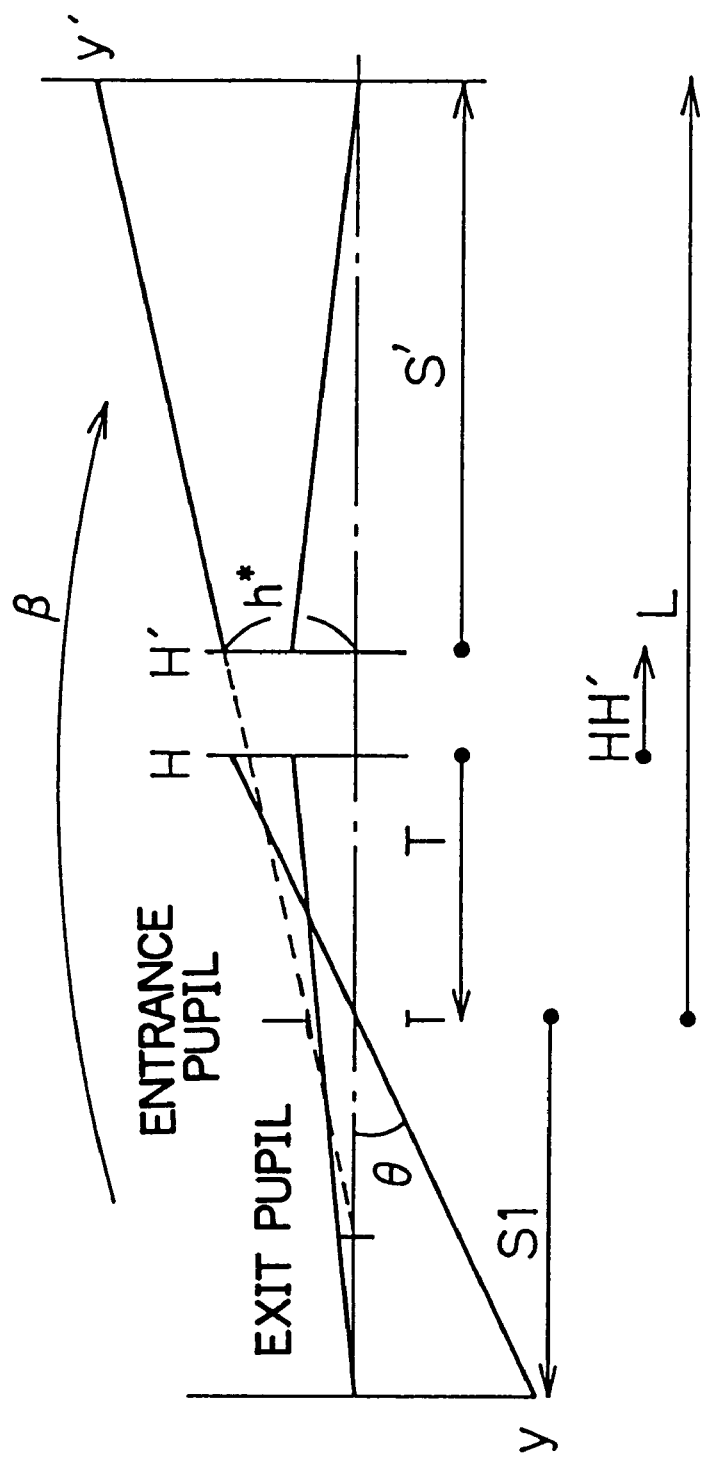
FIG. 3 is a diagram schematically illustrating a typical optical system of a y'=kθ lens.

Here, assume that a y'=kθ lens is used as the scanning lens. On the scanned surface, the image height y' in the main scanning direction increases in proportion to the deflection angle θ with a constant of proportionality k. FIG. 3 schematically shows a typical optical system of the y'=kθ lens. Here, it is assumed that k<0 and that a light beam that goes upward as it travels rightward has a positive angle. In this figure, L represents the distance from the entrance pupil to the image plane, and it corresponds to the distance from the deflection point of the light beam to the scanned surface in the embodiment under discussion. HH' represents the distance between the principal points.

To express s' in terms of L−HH', k, and β, the distance s1 from the entrance pupil to the object plane (a virtual plane in this embodiment) is expressed as $$s1 = -k/\beta$$

and the position of the entrance pupil is expressed as $$T = -s1(L - HH' + k)/(s1 + k)$$
$$= (L - HH' + k)/(\beta - 1)$$

Hence, the distance from the rear-side principal point to the image plane (scanned surface) is expressed as $$s' = L - HH' + T \quad (4)$$
$$= \{\beta(L - HH') + k\}/(\beta - 1)$$

Thus, from expressions (3) and (4), in a y'=kθ lens, variation in back focal length resulting from temperature variation is expressed as $$\Delta s'/\Delta t = -\{\beta(L-HH')+k\} \times [\{-1/(n-1)\}(\Delta n/\Delta t) + \alpha] \quad (5)$$

<2. Determining Magnification Variation from Back Focal Length Variation>

Figure 4:
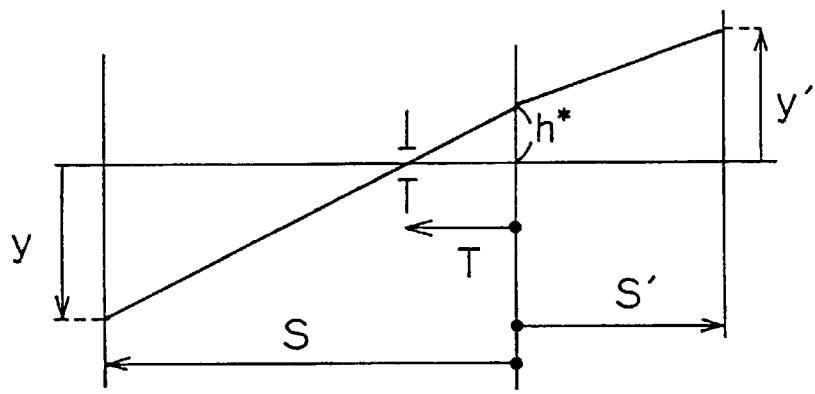
FIG. 4 is a diagram schematically illustrating the optical system of FIG. 3 in a simpler form by further omitting the distance between the principal points.

FIG. 4 schematically illustrates the optical system of FIG. 3 in a simpler form by further omitting the distance between the principal points. In FIG. 4, the height at which a paraxial ray crosses the principal plane is represented by h*. From FIG. 4, it is clear that h* is expressed, in terms of the object height y on the object plane and the previously introduced variables T and s, as $$h^*:T = y:(-s+T)$$

Hence $$h^* = Ty/(T-s)$$

Figure 5:
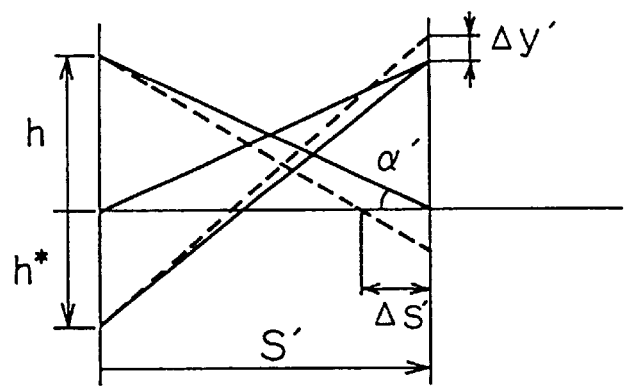
FIG. 5 is a diagram schematically illustrating the image-plane side.

FIG. 5 schematically illustrates the image-plane side. In FIG. 5, the heights at which two paraxial rays cross the principal plane are represented by h and h* respectively. If it is assumed that h*/h=q, then, from FIG. 5, it is clear that the relation $$\Delta y':h^* = \Delta s':(s' - \Delta s')$$

holds. Hence $$\Delta y' = h^* \Delta s'/(s' - \Delta s')$$
$$= \{h\Delta s'/(s' - \Delta s')\}(h^*/h)$$
$$= \{h/(s' - \Delta s')\}\Delta s' q$$
$$= \alpha' \Delta s' q$$

Thus, the relation between temperature variation and magnification variation is expressed as $$\Delta y'/\Delta t = \alpha' q (\Delta s'/\Delta t) \qquad (6)$$

Here, if it is assumed that $\alpha'=h/(s'-\Delta s')\approx h/s'$ and the previously introduced relation $h^* \approx Ty/(T-s)$ is taken into consideration, then $$\alpha' q = (h/s')(h^*/h) = h^*/s'$$
$$= (1/s')\{Ty/T-s)\}$$
$$= (1/s')\{y/(1-s/T)\}$$
$$= (1/s')\{y/\{1-(1/T)(1/\beta)s'\}$$
$$= (1/s')\beta y/\{\beta - (s'/T)\}$$

Substituting in this expression the previously introduced expressions $$T=(L-HH'+k)/(\beta-1)$$
$$s'=\{\beta(L-HH')+k\}/(\beta-1)$$

yields $$\alpha' q = \beta y\{(L-HH')+k\}/k\{\beta(L-HH')+k\}$$

Thus, expression (6) above is rearranged as $$\Delta y/\Delta t=(\Delta s'/\Delta t)\beta y\{(L-HH')+k\}/k\{\beta(L-HH')+k\}$$

Substituting expression (5) in expression (6) and expressing the obtained expression similarly in terms of L−HH', k, and β yields $$\Delta y'/\Delta t=-[\{-1/(n-1)\}(\Delta n/\Delta t)+\alpha]\times\beta y\{(L-HH')+k\}/k \qquad (7)$$

Figure 6:
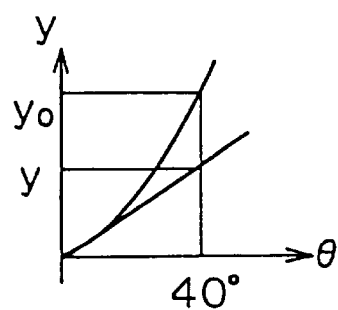
FIG. 6 is a graph illustrating the ideal image height in ordinary projection methods.

Here, as shown in FIG. 6, when θ=40°, then $$\beta y = y_o = (1/P)y,$$

where 0<P<0.83
Here, $y_o$ represents the ideal image height in ordinary projection methods.

Thus, expression (7) is rearranged as $$\Delta y'/\Delta t=-[\{-1/(n-1)\}(\Delta n/\Delta t)+\alpha]\times y\{(L-HH')+k\}/Pk \qquad (8)$$

Further, if it is assumed that $[\{-1/(n-1)\}(\Delta n/\Delta t)+\alpha]=K$, then expression (8) is rearranged as $$\Delta y'/\Delta t=-Ky\{(L-HH')+k\}/Pk \qquad (9)$$

Variation in magnification, which is expressed by expression (9), should ideally be suppressed, for example, below three dots for images with 400 dpi resolution. That is, for an increase in temperature of 20° C., variation in magnification of the scanning lens should ideally be suppressed below 0.18. Ii a y=fθ lens where f=318, variation in magnification for an increase in temperature of 20° C. is 0.24. Accordingly, suppressing magnification variation below 0.18 in expression (9) means decreasing the power of the scanning lens at its edges as described earlier.

<3. Determining Conditions>

Expression (9) is rearranged as $$\Delta y' P/y \Delta t K = -\{(L-HH')+k\}/k \qquad (10)$$

Substituting y=150, Δt=20, $2.5\times10^{-4} \leq K \leq 2.9\times10^{-4}$, and 0<P<0.83 in this expression yields $$0 <-\{(L-HH')+k\}/\leq 0.20 \qquad (11)$$

As long as this condition is satisfied, variation in magnification is kept below 0.18.

Figure 7:
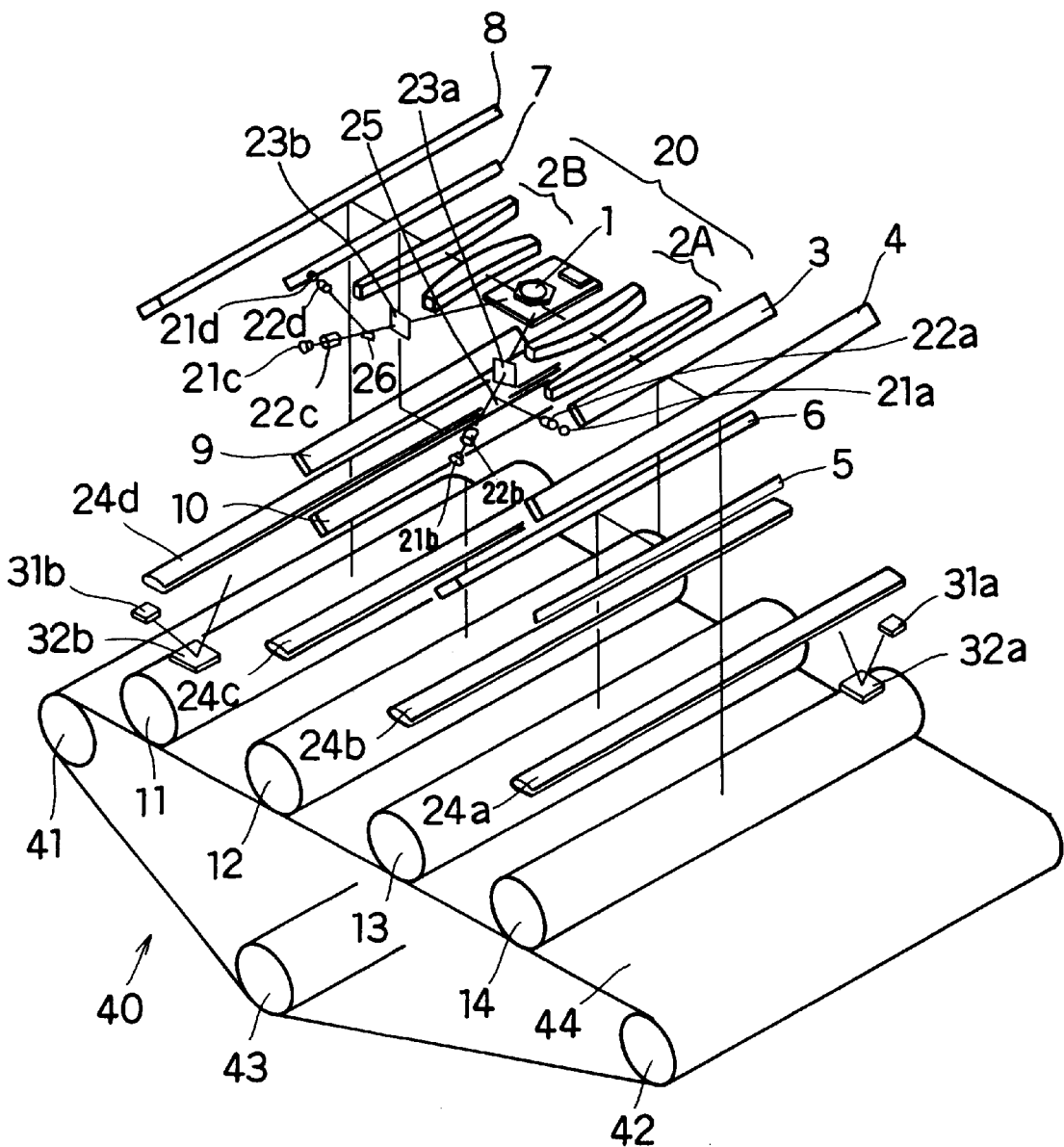
FIG. 7 is a perspective view of a tandem-type scanning optical apparatus embodying the invention.
Figure 8:
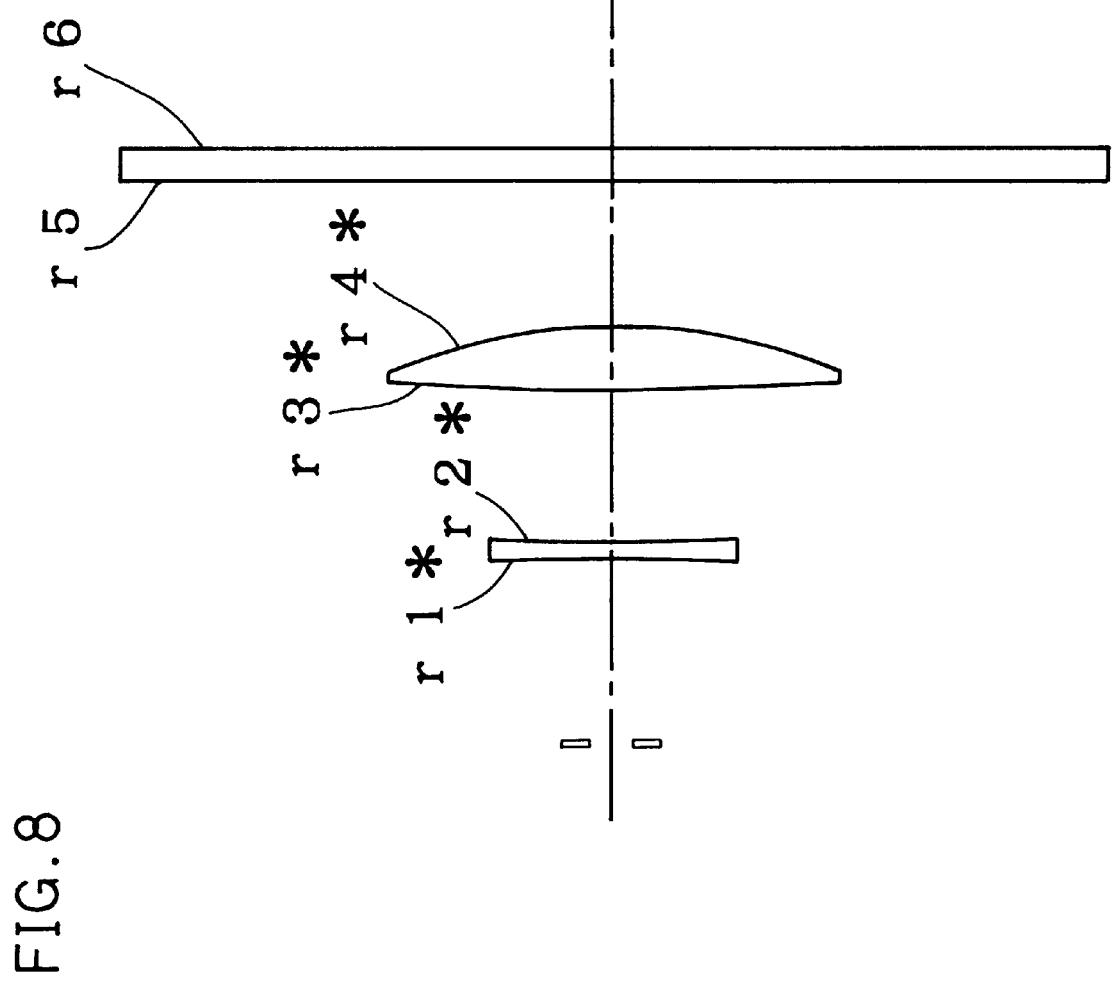
FIG. 8 is a lens arrangement diagram of the scanning optical system of a first numerical example of the invention.
Figure 9:
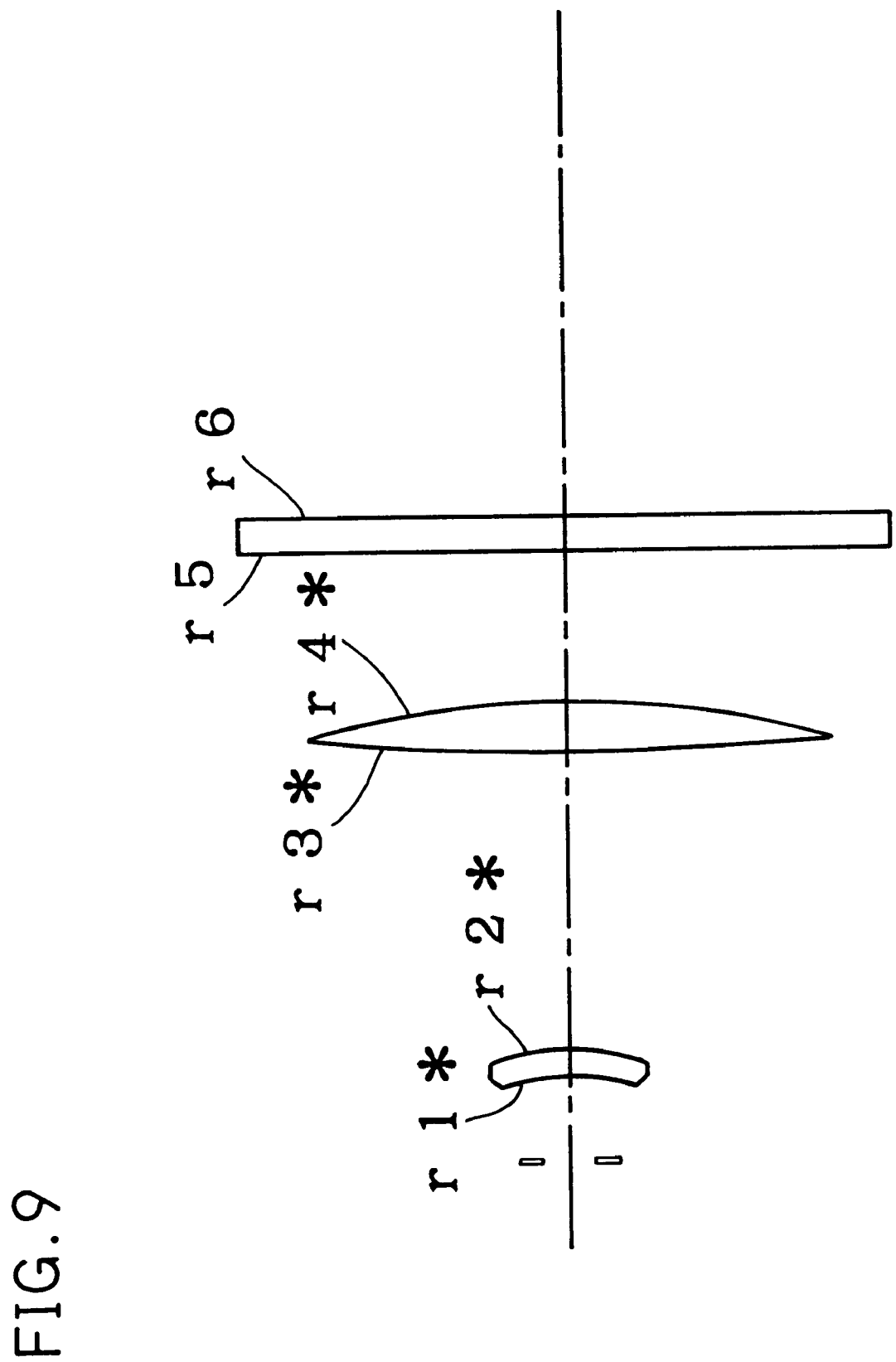
FIG. 9 is a lens arrangement diagram of the scanning optical system of a second numerical example of the invention.
Figure 10:
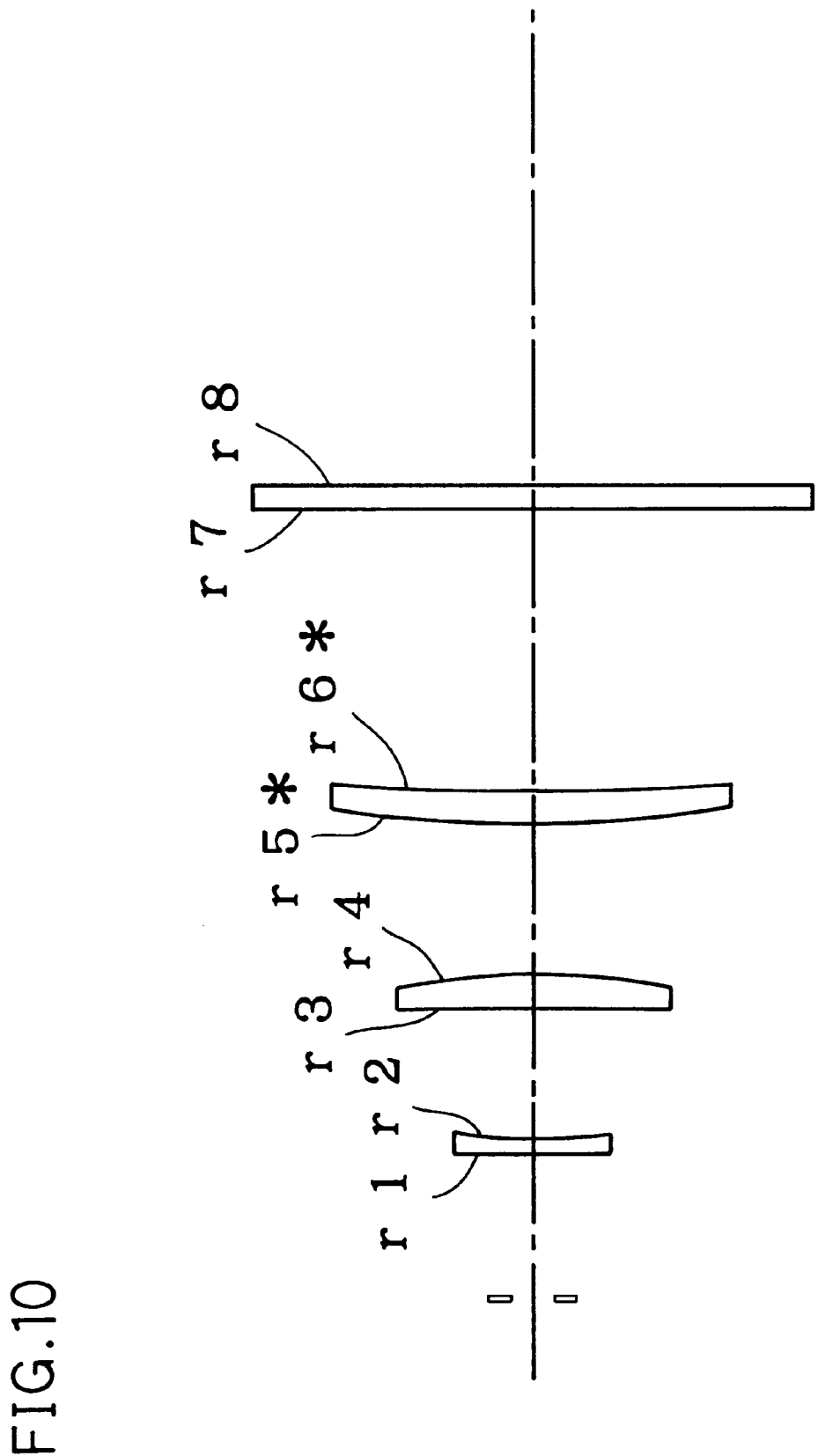
FIG. 10 is a lens arrangement diagram of the scanning optical system of a third numerical example of the invention.
Figure 11:
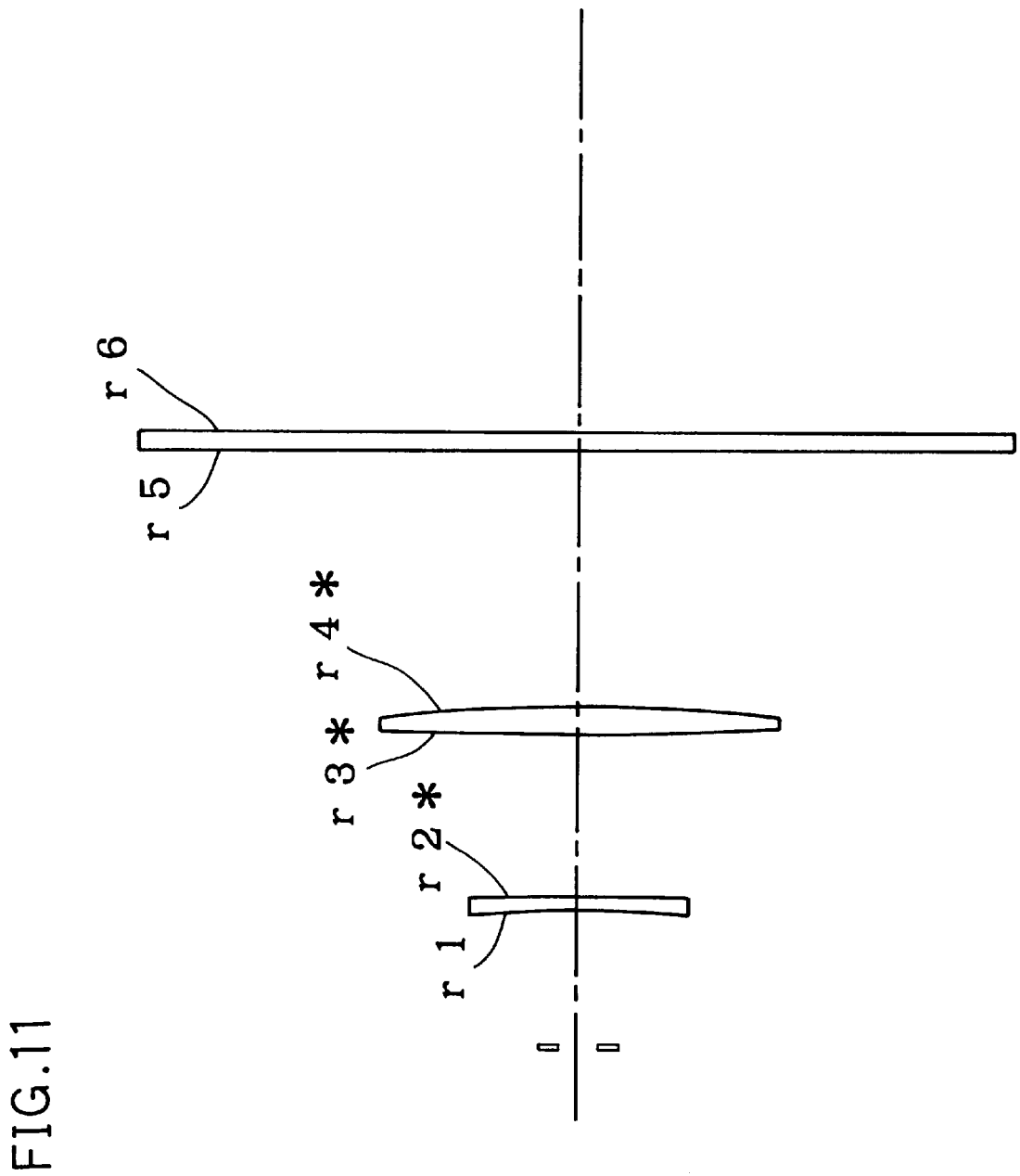
FIG. 11 is a lens arrangement diagram of the scanning optical system of a fourth numerical example of the invention.
Figure 12:
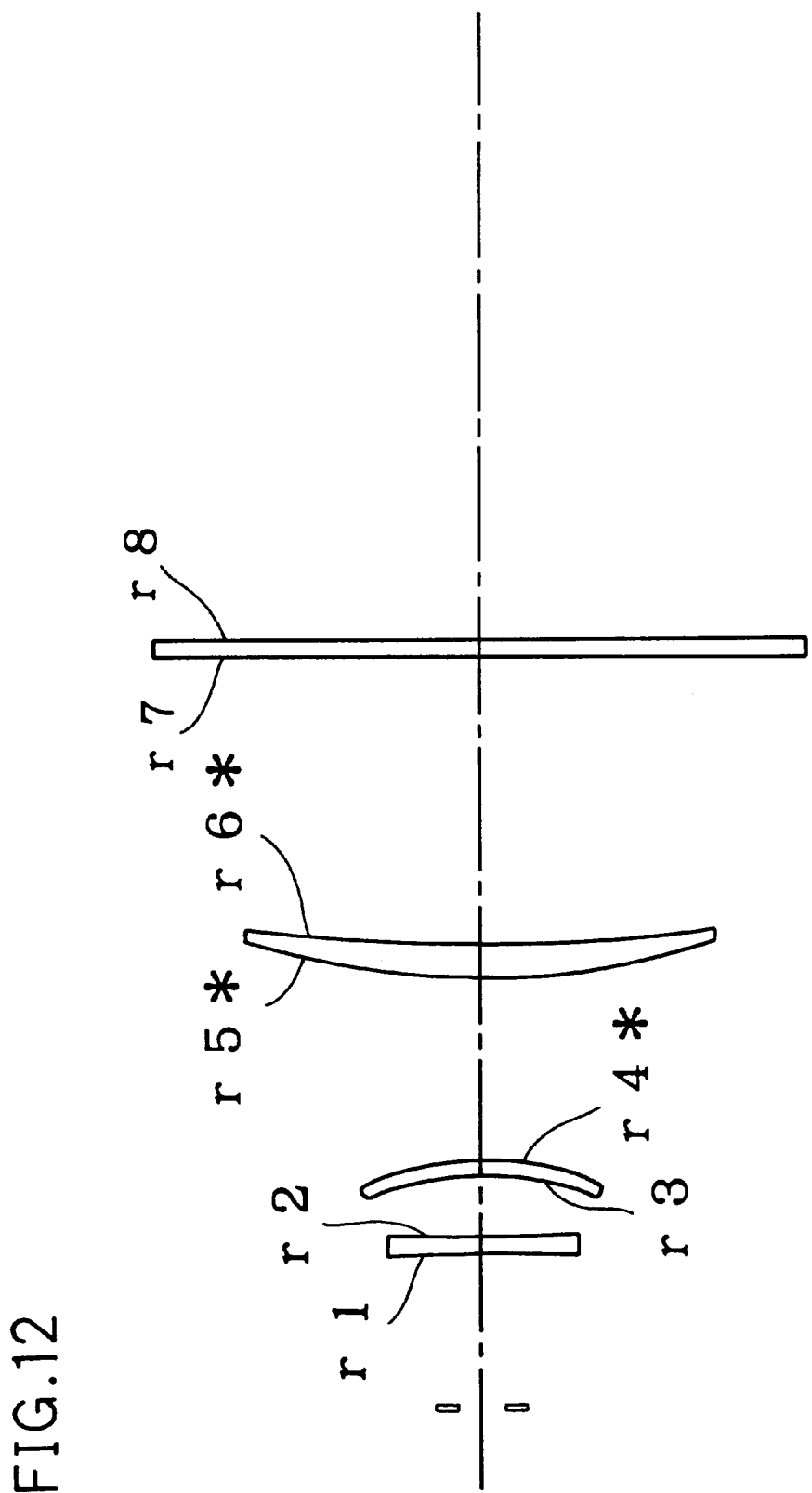
FIG. 12 is a lens arrangement diagram of the scanning optical system of a fifth numerical example of the invention.
Figure 13:
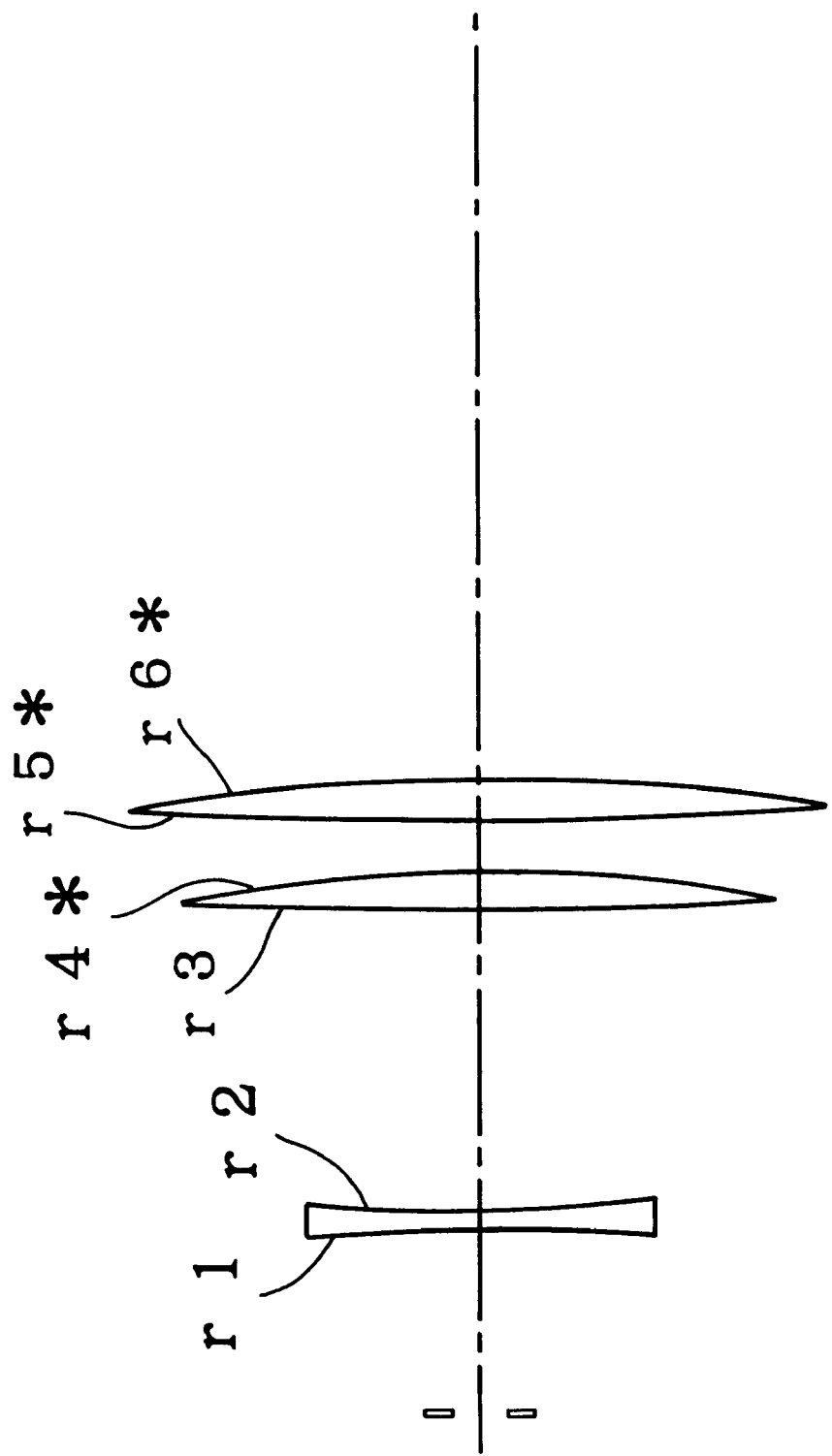
FIG. 13 is a lens arrangement diagram of the scanning optical system of a sixth numerical example of the invention.
Figure 14:
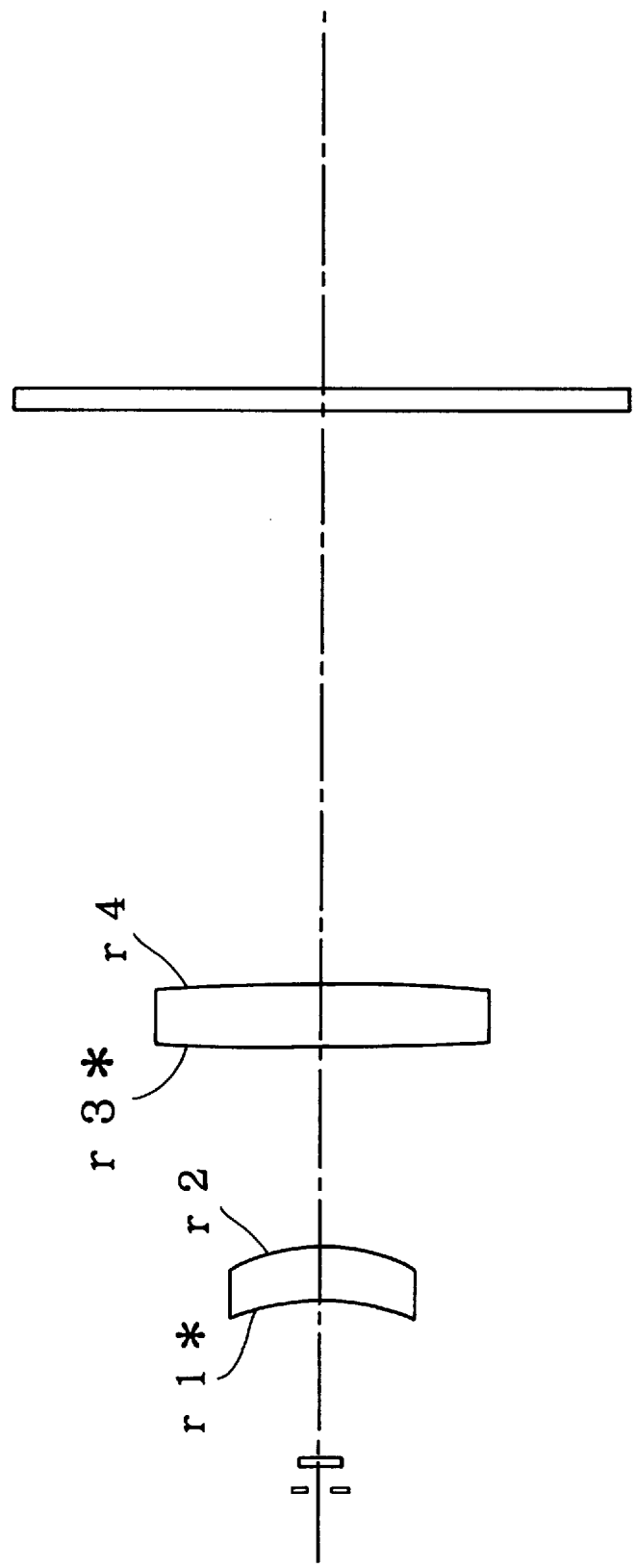
FIG. 14 is a lens arrangement diagram of the scanning optical system of a seventh numerical example (fθ) of the invention.

As an example of a scanning optical apparatus that employs a scanning optical system as described above, FIG. 7 shows a tandem-type scanning optical apparatus. In FIG. 7, for simplicity's sake, components around a light-sensitive drum, such as a developer and a charger, are omitted. In FIG. 7. a printer head 20 is built around a polygon mirror 1 driven by a polygon motor (not shown) so as to rotate at uniform speed, and has four laser diodes 21a to 21d, scanning lenses 2A and 2B, and other optical components arranged symmetrically with respect to the plane that includes the axis of rotation of the polygon mirror 1 and that is perpendicular to the she et transfer direction.

The laser beams La to Ld emitted from the laser diodes 21a to 21d are first made into converging beams as they pass through collimator lenses 22a to 22d that have cylindrical shapes. In conventional structures, the light sources are disposed at the focal points of the collimator lenses to obtain parallel light beams; however, according to the present invention, the light sources are disposed farther away from the collimator lenses to obtain converging light beams. After being made into converging beams, the laser beams La to Ld takes the following paths. The laser beam Ld is reflected by a reflecting mirror 26 and is thereby made to travel vertically parallel to the laser beam Lc. These two laser beams Lc and Ld both pass through a first cylindrical lens 23b, are thereby condensed only in the direction of the rotation axis of the polygon mirror 1, and are reflected and thereby deflected by a reflecting surface of the polygon mirror 1.

After being deflected, the laser beams Ld and Lc pass through the scanning lens 2B, and then the lower laser beam Ld is deflected by a deflecting mirror 8 and is condensed by a second cylindrical lens 24d in the subsidiary scanning direction so that it is shone onto a light-sensitive drum 11 to scan its surface, whereas the upper laser beam Lc is deflected by deflecting mirrors 7, 9, and 10 and is condensed by a second cylindrical lens 24c in the subsidiary scanning direction so that it is shone onto a light-sensitive drum 12 to scan its surface.

Similarly, the laser beam La is reflected by a reflecting mirror 25 and is thereby made to travel vertically parallel to the laser beam Lb. These two laser beams La and Lb both pass through a first cylindrical lens 23a, are thereby condensed only in the direction of the rotation axis of the polygon mirror 1, and are deflected by the polygon mirror 1. At this time, since the laser beams La and Lb strike the polygon mirror 1 from the opposite direction as compared with the laser beams Lc and Ld, the former are reflected in the opposite direction and are moved along the respective scanning lines in the opposite direction as compared with the latter.

After being deflected, the laser beams La and Lb both pass through the scanning lens 2A, and then the lower laser beam La is deflected by a deflecting mirror 4 and is, through a second cylindrical lens 24a, shone onto a light-sensitive drum 14 to scan its surface, whereas the upper laser beam Lb is deflected by deflecting mirrors 3, 5, and 6 and is, through a second cylindrical lens 24b, shone onto a light-sensitive drum 13 to scan its surface.

Having the structure as described above, this scanning optical apparatus requires only one polygon motor. This helps simplify the rotation control system. In addition, each of the pair of scanning lenses can handle the scanning of two laser beams. This helps reduce the number of lenses required and thus reduce the production cost.

Note that, in FIG. 7, numerals 31a and 31b represent SOS (start of scan) sensors each composed of a photodiode. These SOS sensors 31a and 31b, when they receive the reflection from the mirrors 32a and 32b, respectively, of the laser beams incident thereon, produce SOS signals. Based on these SOS signals, a controller (not shown) determines the timing with which each beam performs writing of an image in the main scanning direction (i.e. regulates the horizontal synchronization). The reason why the SOS sensors are provided only in positions corresponding to the laser beams La and Ld is that, as described previously, the laser beam Lc is paired with the laser beam Ld, and the laser beam Lb is paired with the laser beam La, so that each pair of vertically parallel laser beams is reflected by an identical mirror surface of the polygon mirror 1 for scanning, and therefore that the horizontal synchronization of one of such a pair of laser beams can be achieved by the use of the SOS signal for the other.

Moreover, in FIG. 7, numeral 40 at the bottom of the figure represents a sheet transfer unit, in which a transfer belt 44 supported on a driving roller 41 and a supporting roller 42 and given appropriate tension by a tension roller 43 is kept in motion by the rotation of the driving roller 41 so that a recording sheet (not shown) is fed at a predetermined feed speed in synchronism with the image-forming movement of each beam.

The present invention is applicable not only to tandem-type scanning optical systems and apparatuses as described above, but also to scanning optical systems and apparatuses in which light sources and lens systems are so arranged that the light beams emitted from a plurality of light sources are reflected by a single mirror surface of a polygon mirror to scan a single scanned surface in such a way that all the light beams are focused on the same scanned surface to form an image thereon.

Tables 1 to 7 list the construction data of a first to a seventh numerical example of scanning optical systems according to the present invention. All the values included in the construction data relate to the main scanning direction, since the present invention has no concern in how scanning is performed in the subsidiary direction. The lens arrangements of the first to seventh numerical examples are shown in FIGS. 8 to 14. Of these numerical examples, the seventh is designed as an fθ lens.

In the construction data of each numerical example, ri (i=1, 2, 3, . . . ) represents the radius of curvature of the ith surface from the object side, di (i=1, 2, 3, . . . ) represents the ith axial distance from the object side, and Ni represents the refractive index of the ith lens from the object side for light having a wavelength λ of 780 nm. In each numerical example, a surface marked with an asterisk (*) is an asphirocial surface, whose surface shape is defined by the formula $$Y = CX^2/\{1+(1-\epsilon C^2 X^2)^{1/2}\} + \Sigma A_i X^i$$

where

X represents the height in a direction perpendicular to the optical axis,

Y represents the displacement from the reference surface along the optical axis, C represents the paraxial curvature, ε represents the quadric surface parameter, and $A_i$ represents the aspherical coefficient of the ith order.

Table 8 lists the variation in magnification as observed in each numerical example when the temperature of the scanning lens has risen by 20° C., in comparison with the value of Condition (11) in each case. As Table 8 shows, the range defined by Condition (11) agrees well with the actual values observed in the numerical examples.

As described heretofore, according to the present invention, it is possible to obtain a scanning optical system designed as a multiple-beam scanning optical system that does not suffer from color misplacement due to variation in magnification even when there are temperature differences between individual light sources and scanning lenses, and it is possible to obtain a scanning optical apparatus employing such a scanning optical system.

TABLE 1

<Numerical Example 1>

| Radius of Curvature | Axial Distance | Refractive Index |
|---|---|---|
| r1* = −693.7 | | |
| | d1 = 4.0 | N1 = 1.519 |
| r2* = 510.8 | | |
| | d2 = 37.0 | |
| r3* = 736.5 | | |
| | d3 = 15.0 | N2 = 1.571 |
| r4* = −150.3 | | |
| | d4 = 35.0 | |
| r5 = ∞ | | |
| | d5 = 8.0 | N3 = 1.485 |
| r6 = ∞ | | |

[Aspherical Coefficients of Surface r1]

ε = 1.00000000
A4 = 0.4528 × 10$^{-19}$
A6 = 0.2748 × 10$^{-26}$
A8 = 0.2496 × 10$^{-31}$
A10 = 0.7523 × 10$^{-20}$

[Aspherical Coefficients of Surface r2]

ε = 1.00000000
A4 = −0.5316 × 10$^{-20}$
A6 = −0.3535 × 10$^{-26}$
A8 = −0.7378 × 10$^{-16}$
A10 = −0.1134 × 10$^{-19}$

[Aspherical Coefficients of Surface r3]

ε = 1.00000000
A4 = −0.1758 × 10$^{-7}$
A6 = 0.1382 × 10$^{-11}$
A8 = −0.4347 × 10$^{-16}$
A10 = −0.6716 × 10$^{-19}$

[Aspherical Coefficients of Surface r4]

ε = 1.00000000
A4 = −0.3317 × 10$^{-8}$
A6 = −0.2684 × 10$^{-11}$
A8 = 0.1201 × 10$^{-14}$
A10 = −0.2473 × 10$^{-18}$

TABLE 2

<Numerical Example 2>

| Radius of Curvature | Axial Distance | Refractive Index |
|---|---|---|
| r1* = −46.7 | | |
| | d1 = 6.0 | N1 = 1.519 |
| r2* = −50.7 | | |
| | d2 = 69.4 | |
| r3* = 576.9 | | |
| | d3 = 12.0 | N2 = 1.571 |
| r4* = −237.2 | | |
| | d4 = 35.0 | |
| r5 = ∞ | | |
| | d5 = 8.0 | N3 = 1.485 |
| r6 = ∞ | | |

[Aspherical Coefficients of Surface r1]

$\epsilon = 1.00000000$
$A4 = 0.4486 \times 10^{-19}$
$A6 = 0.3609 \times 10^{-26}$
$A8 = 0.6834 \times 10^{-15}$
$A10 = 0.1925 \times 10^{-18}$

[Aspherical Coefficients of Surface r2]

$\epsilon = 1.00000000$
$A4 = 0.1721 \times 10^{-21}$
$A6 = -0.3105 \times 10^{-14}$
$A8 = -0.1704 \times 10^{-14}$
$A10 = -0.3816 \times 10^{-18}$

[Aspherical Coefficients of Surface r3]

$\epsilon = 1.00000000$
$A4 = -0.1758 \times 10^{-7}$
$A6 = 0.1382 \times 10^{-11}$
$A8 = -0.1854 \times 10^{-14}$
$A10 = 0.1581 \times 10^{-18}$

[Aspherical Coefficients of Surface r4]

$\epsilon = 1.00000000$
$A4 = 0.3404 \times 10^{-8}$
$A6 = 0.3541 \times 10^{-11}$
$A8 = -0.2523 \times 10^{-14}$
$A10 = 0.1469 \times 10^{-18}$

TABLE 3

<Numerical Example 3>

| Radius of Curvature | Axial Distance | Refractive Index |
|---|---|---|
| r1 = ∞ | | |
| | d1 = 4.0 | N1 = 1.519 |
| r2 = 243.8 | | |
| | d2 = 32.0 | |
| r3 = −1070.4 | | |
| | d3 = 8.0 | N2 = 1.519 |
| r4 = −201.2 | | |
| | d4 = 37.0 | |
| r5* = 297.2 | | |
| | d5 = 8.0 | N3 = 1.519 |
| r6* = 559.7 | | |
| | d6 = 70.0 | |
| r7 = ∞ | | |
| | d7 = 5.0 | N4 = 1.519 |
| r8 = ∞ | | |

[Aspherical Coefficients of Surface r5]

$\epsilon = 1.00000000$
$A4 = -0.1405 \times 10^{-6}$
$A6 = 0.5874 \times 10^{-12}$
$A8 = 0.1508 \times 10^{-15}$
$A10 = -0.2387 \times 10^{-20}$ TABLE 3-continued <Numerical Example 3>

[Aspherical Coefficients of Surface r6]

$\epsilon = 1.00000000$
$A4 = -0.1637 \times 10^{-6}$
$A6 = 0.2308 \times 10^{-12}$
$A8 = -0.1440 \times 10^{-15}$
$A10 = 0.1200 \times 10^{-19}$

TABLE 4

<Numerical Example 4>

| Radius of Curvature | Axial Distance | Refractive Index |
|---|---|---|
| r1 = −299.5 | | |
| | d1 = 4.0 | N1 = 1.519 |
| r2* = −979.0 | | |
| | d2 = 45.0 | |
| r3* = 1228.9 | | |
| | d3 = 8.0 | N2 = 1.519 |
| r4* = −495.0 | | |
| | d4 = 70.0 | |
| r5 = ∞ | | |
| | d5 = 5.0 | N3 = 1.485 |
| r6 = ∞ | | |

[Aspherical Coefficients of Surface r2]

$\epsilon = 1.00000000$
$A4 = 0.3577 \times 10^{-18}$
$A6 = 0.1485 \times 10^{-14}$
$A8 = 0.1660 \times 10^{-19}$
$A10 = 0.1487 \times 10^{-24}$

[Aspherical Coefficients of Surface r3]

$\epsilon = 1.00000000$
$A4 = -0.8790 \times 10^{-8}$
$A6 = 0.6908 \times 10^{-12}$
$A8 = -0.2173 \times 10^{-16}$
$A10 = -0.1337 \times 10^{-20}$

[Aspherical Coefficients of Surface r4]

$\epsilon = 1.00000000$
$A4 = 0.8334 \times 10^{-8}$
$A6 = -0.8036 \times 10^{-12}$
$A8 = -0.8387 \times 10^{-17}$
$A10 = 0.7834 \times 10^{-20}$

TABLE 5

<Numerical Example 5>

| Radius of Curvature | Axial Distance | Refractive Index |
|---|---|---|
| r1 = −847.0 | | |
| | d1 = 4.0 | N1 = 1.519 |
| r2 = 478.7 | | |
| | d2 = 15.0 | |
| r3 = −72.3 | | |
| | d3 = 4.0 | N2 = 1.519 |
| r4* = −66.3 | | |
| | d4 = 45.0 | |
| r5* = 190.6 | | |
| | d5 = 8.0 | N3 = 1.519 |
| r6* = 513.5 | | |
| | d6 = 70.0 | |
| r7 = ∞ | | |
| | d7 = 5.0 | N4 = 1.485 |
| r8 = ∞ | | |

TABLE 5-continued

<Numerical Example 5>

[Aspherical Coefficients of Surface r4]

$\epsilon = 1.00000000$
$A4 = 0.1837 \times 10^{-8}$
$A6 = 0.1485 \times 10^{-13}$
$A8 = 0.7150 \times 10^{-19}$
$A10 = 0.2616 \times 10^{-24}$

[Aspherical Coefficients of Surface r5]

$\epsilon = 1.00000000$
$A4 = -0.1320 \times 10^{-7}$
$A6 = 0.6224 \times 10^{-12}$
$A8 = -0.2243 \times 10^{-16}$
$A10 = -0.1342 \times 10^{-20}$

[Aspherical Coefficients of Surface r6]

$\epsilon = 1.00000000$
$A4 = 0.1274 \times 10^{-7}$
$A6 = -0.7316 \times 10^{-12}$
$A8 = 0.4311 \times 10^{-15}$
$A10 = -0.4078 \times 10^{-19}$

TABLE 6

<Numerical Example 6>

| Radius of Curvature | Axial Distance | Refractive Index |
|---|---|---|
| r1 = −587.4 | | |
| | d1 = 4.0 | N1 = 1.519 |
| r2 = 380.7 | | |
| | d2 = 60.0 | |
| r3 = 2000.0 | | |
| | d3 = 8.0 | N2 = 1.519 |
| r4* = −300.0 | | |
| | d4 = 10.0 | |
| r5* = 1500.0 | | |
| | d5 = 8.0 | N3 = 1.519 |
| r6* = −500.0 | | |

[Aspherical Coefficients of Surface r4]

$\epsilon = 1.00000000$
$A4 = -0.1240 \times 10^{-7}$
$A6 = 0.2305 \times 10^{-11}$
$A8 = -0.5255 \times 10^{-16}$
$A10 = 0.1813 \times 10^{-18}$

[Aspherical Coefficients of Surface r5]

$\epsilon = 1.00000000$
$A4 = 0.2146 \times 10^{-8}$
$A6 = 0.8673 \times 10^{-12}$
$A8 = 0.2994 \times 10^{-15}$
$A10 = 0.1158 \times 10^{-19}$

[Aspherical Coefficients of Surface r6]

$\epsilon = 1.00000000$
$A4 = -0.4668 \times 10^{-8}$
$A6 = -0.5901 \times 10^{-12}$
$A8 = -0.2368 \times 10^{-16}$
$A10 = 0.1519 \times 10^{-19}$

TABLE 7

<Numerical Example 7 (fθ lens)>

| Radius of Curvature | Axial Distance | Refractive Index |
|---|---|---|
| r1* = −76.5 | | |
| | d1 = 15.3 | N1 = 1.524 |
| r2 = −59.8 | | |

TABLE 7-continued

<Numerical Example 7 (fθ lens)>

| | | |
|---|---|---|
| | d2 = 56.6 | |
| r3* = 4176.7 | | |
| | d3 = 17.7 | N2 = 1.524 |
| r4 = −919.0 | | |

[Aspherical Coefficients of Surface r1]

$\epsilon = 1.00000000$
$A4 = -0.4135 \times 10^{-6}$
$A6 = -0.2430 \times 10^{-10}$
$A8 = 0.7523 \times 10^{-15}$
$A10 = -0.7189 \times 10^{-17}$

[Aspherical Coefficients of Surface r3]

$\epsilon = 1.00000000$
$A4 = 0.9613 \times 10^{-7}$
$A6 = -0.7307 \times 10^{-11}$
$A8 = 0.3818 \times 10^{-15}$
$A10 = -0.9792 \times 10^{-20}$

TABLE 8

| | $-\{(L - HH') + k\}/k$ | Actual Value as Observed in Numerical Examples | Theoretical Value as Calculated for Paraxial Rays |
|---|---|---|---|
| Numerical Example 1 | 0.36 | 0.25 | 0.28 |
| Numerical Example 2 | 0.37 | 0.24 | 0.29 |
| Numerical Example 3 | 0.09 | 0.13 | 0.08 |
| Numerical Example 4 | 0.002 | 0.06 | 0.02 |
| Numerical Example 5 | 0.09 | 0.13 | 0.08 |
| Numerical Example 6 | 0.19 | 0.2 | 0.16 |
| Numerical Example 7 | | 0.24 | |

What is claimed is:

1. A scanning optical system in which a plurality of light beams emitted from a plurality of light sources are, after being formed into beams converging in a predetermined manner, deflected by a single deflector and are then shone, through scanning lens systems provided one for each light beam, onto a scanned surface so that the scanned surface is scanned by the light beams for image formation, wherein all of the plurality of light beams incident on said scanning lens systems are converging light beams, and wherein at least one of said scanning lens systems satisfies the following condition:

$$0 < -\{(L-HH')+k\}/k \leq 0.2,$$

where

L represents a distance from a point of deflection of the light beam to the scanned surface, HH' represents a distance from a front-side principal point to a rear-side principal point of the scanning lens system, and k (k<0) represents a constant of proportionality defined by the following formula:

$$y' = k\theta,$$

where
- y' represents an image height on the scanned surface in a main scanning direction, and
- θ represents an angle of deflection, that is, an angle that the light beam, after being deflected by the deflector, forms with respect to an optical axis of the scanning lens system.

2. A scanning optical apparatus that employs a scanning optical system as claimed in claim 1 to shine the plurality of light beams onto a single scanned surface so that the scanned surface is scanned by the light beams for image formation.

3. A scanning optical system in which a plurality of light beams emitted from a plurality of light sources are, after being formed into beams converging in a predetermined manner, deflected by a single deflector and are then shone, through scanning lens systems provided one for each light beam, onto a scanned surface so that the scanned surface is scanned by the light beams for image formation, wherein at least one of said scanning lens systems satisfies the following condition:

$$0 < -\{(L-HH')+k\}/k \leq 0.2,$$

where
- L represents a distance from a point of deflection of the light beam to the scanned surface,
- HH' represents a distance from a front-side principal point to a rear-side principal point of the scanning lens system, and
- k (k<0) represents a constant of proportionality defined by the following formula:

$$y'=k\theta,$$

where
- y' represents an image height on the scanned surface in a main scanning direction, and
- θ represents an angle of deflection, that is, an angle that the light beam, after being deflected by the deflector, forms with respect to an optical axis of the scanning lens system.

4. A scanning optical apparatus that employs a scanning optical system as claimed in claim 3 to shine the plurality of light beams onto a plurality of scanned surfaces provided one for each light beam so that the scanned surfaces are scanned by the light beams for image formation.

5. scanning optical apparatus that employs a scanning optical system as claimed in claim 3 to shine the plurality of light beams onto a single scanned surface so that the scanned surface is scanned by the light beams for image formation.

6. A scanning optical apparatus that employs a scanning optical system to shine the plurality of light beams onto a plurality of scanned surfaces provided one for each light beam so that the scanned surfaces are scanned by the light beams for image formation, wherein said scanning optical system comprises a plurality of light beams emitted from a plurality of light sources are, after being formed into beams converging in a predetermined manner, deflected by a single deflector and are then shone, through scanning lens systems provided one for each light beam, onto scanned surfaces so that the scanned surfaces are scanned by the light beams for image formation, wherein all of the plurality of light beams incident on said scanning lens systems are converging light beams, and wherein at least one of said scanning lens systems satisfies the following condition:

$$0 < -\{(L-HH')+k\}/k \leq 0.2,$$

where
- L represents a distance from a point of deflection of the light beam to the scanned surface,
- HH' represents a distance from a front-side principal point to a rear-side principal point of the scanning lens system, and
- k (k<0) represents a constant of proportionality defined by the following formula:

$$y'=k\theta,$$

where
- y' represents an image height on the scanned surface in a main scanning direction, and
- θ represents an angle of deflection, that is, an angle that the light beam, after being deflected by the deflector, forms with respect to an optical axis of the scanning lens system.

7. A scanning optical system comprising:

a plurality of light sources emitting a plurality of light beams;

means for converging each light beam of said plurality of light beams;

a single deflector deflecting each light beam of said plurality of light beans after being formed into beams converging; and a plurality of scanning lens systems, each respective scanning system being provided one for each light beam, and receiving a converging light beam from said single deflector and emitting a converging light beam onto a scanned surface so that the scanned surface is scanned by the light beams for image formation, wherein all of the plurality of light beams incident on said scanning lens systems are converging light-beams, wherein at least one of said scanning lens systems satisfies the following condition:

$$0 < -\{(L-HH')+k\}/k \leq 0.2,$$

where
- L represents a distance from a point of deflection of the light beam to the scanned surface,
- HH' represents a distance from a front-side principal point to a rear-side principal point of the scanning lens system, and
- k (k<0) represents a constant of proportionality defined by the following formula:

$$y'=k\theta,$$

where
- y' represents an image height on the scanned surface in a main scanning direction, and
- θ represents an angle of deflection, that is, an angle that the light beam, after being deflected by the deflector, forms with respect to an optical axis of the scanning lens system.

* * * * *